United States Patent

Mazur

[11] 3,925,344
[45] Dec. 9, 1975

[54] PLASMA PROTEIN SUBSTITUTE
[75] Inventor: Abraham Mazur, New York, N.Y.
[73] Assignee: The Community Blood Council of Greater New York, Inc., New York, N.Y.
[22] Filed: Feb. 13, 1974
[21] Appl. No.: 442,276

Related U.S. Application Data
[63] Continuation-in-part of Ser. No. 350,225, April 11, 1973, abandoned.

[52] U.S. Cl. .............................. 260/112.5; 424/177
[51] Int. Cl.[2] ................ C07C 103/52; A61K 37/00
[58] Field of Search ....... 260/112 B, 112.5; 424/177

[56] References Cited
UNITED STATES PATENTS
3,788,948  1/1974  Kagedal et al. ................. 260/112 B OTHER PUBLICATIONS
Fasold et al.: Angew. Chem. Internat. Ed., 10, 795–801 (1971).
Usami et al.: Proc. Soc. Exp. Biol. Med., 136, 1232–1235 (1971).
Simon: Dissert. Abstr. Int. B, 30, 2583–2584 (1969).
Sakura: Dissert. Abstr. Int. B, 31, 1064–1065 (1970).
Hartman et al.: Chem. Abstr. 67:70739e (1967).
Wold: Methods in Enyzmol., II, 637–638 (1967).

*Primary Examiner*—Lewis Gotts
*Assistant Examiner*—Reginald J. Suyat
*Attorney, Agent, or Firm*—Burgess, Dinklage & Sprung

[57] ABSTRACT

A plasma protein substitute having polymer repeating units of the formula:

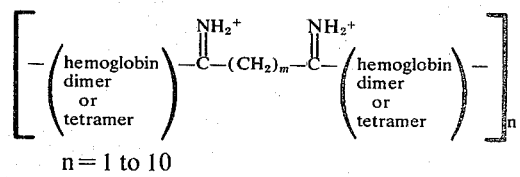

$n = 1$ to $10$ which plasma protein substitute has an average molecular weight between 68,000 and 600,000; an intramolecular cross-linked hemoglobin composition wherein polypeptide units of a hemoglobin tetramer are joined together by a cross-linking agent having the residue:

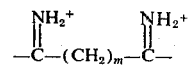

I wherein $m$ is 6 to 12, especially an intra-molecular cross-linked hemoglobin composition wherein single polypeptide units are joined together by the cross-linking residue set forth above, and the method of preparing said composition.

23 Claims, No Drawings

PLASMA PROTEIN SUBSTITUTE

CROSS REFERENCE APPLICATIONS

This is a continuation-in-part of copending application Ser. No. 350,225 of Apr. 11, 1973, now abandoned.

BACKGROUND OF THE INVENTION

1. Field of the Invention

This invention is directed to a plasma protein material, also known as a plasma expander. More particularly, this invention is directed to a cross-linked polymeric hemoglobin material which functions as a plasma protein substitute or plasma expander which is compatible with the chemical system of the human body and which breaks down ultimately to amino acids which can be readily used by or discharged from the body. The present invention is particularly directed to intra-molecular cross-linked hemoglobin materials of low molecular weight, especially intra-molecular cross-linked hemoglobin material having a molecular weight between 68,000 and 85,000. The present invention is also directed to a method of increasing the blood pressure of a mammal by introducing a plasma protein substitute which plasma protein substitute is a cross-linked hemoglobin with an average molecular weight of about 250,000.

2. Discussion of the Prior Art

Whole blood has been found to be a highly useful substance in the treatment of patients suffering from loss of blood or shock. Unfortunately, whole blood can presently be stored for only about 21 days. It has been found that whole blood undergoes disintegration with respect to the red blood cells therein which necessitates discarding the red cells. Within the not too distant past, it has been proposed to separate the whole blood into a number of its components which can be preserved for future use. One such component is the blood plasma. Unfortunately, there still exist substances like hemoglobin of a proteinaceous nature in whole blood which heretofore have been discarded. Within the fairly recent past, it has been proposed to separate serum albumin from the plasma which is a proteinaceous material found to be useful as a plasma protein substitute or plasma expander. Heretofore, the hemoglobin in the red cells has been discarded as no known use therefor was available. Hemoglobin is a protein which has as its principal function the carrying of oxygen from the lungs through the bloodstream to the tissues of the body. Like other proteins in the plasma, hemoglobin can also have an additional function which is most important and that is to assist in maintaining the proper blood pressure within the body. Osmotic pressure is caused to be created against the membranes of the blood vessels which enables the water and other low molecular weight materials of the blood to pass through the membrane walls of the small blood vessels (capillaries) whereby the desired blood pressure level is maintained.

However, when a patient loses blood, the plasma proteins which maintain the blood pressure balance are also lost. Should a substantial amount of the plasma protein material be lost from the blood vessels, the blood pressure drop approaches a critical level and water passes from the blood into the tissues (edema).

Unfortunately, even if hemoglobin were to be used as a plasma expander it suffers from the fact that in the body system the weak bonds joining the polypeptide groups of the tetramer are severed allowing the hemoglobin to be broken into polypeptides of low molecular weight (17,000) and become discharged.

It has become desirable to provide a material which will rapidly and readily, when injected into the blood vessels, raise the blood pressure level to desired predetermined values and to counter any tendency towards edema. Moreover, it has become highly desirable to provide a plasma protein substitute based on a natural material which the body can readily handle and dispose of. Still moreover, it has become highly desirable to provide a use for the hemoglobin found in the red blood cells of whole blood and to thereby preserve such valuable proteinaceous material.

Additionally, it has become desirable to provide a hemoglobin material of approximately the same molecular weight as natural hemoglobin but which does not become fragmented into individual polypeptide units in the blood stream.

SUMMARY OF THE INVENTION

The above long-felt desires are answered, pursuant to the present invention, by a plasma protein substitute in the form of a cross-linked hemoglobin substance which substance has repeating units of the cross-linked

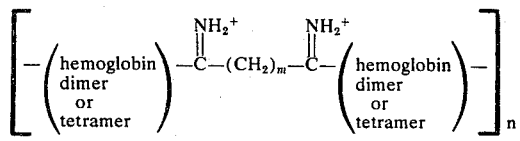

which substitute has an average molecular weight between 68,000 and 600,000. In the formula $n = 1$ to 10 and $m$ is 1 to 12.

Hemoglobin can be cross-linked through use of cross-linking agents of the formula:

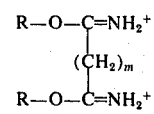

wherein $m$ is 1 to 12 and R is an alkyl group of 1 to 4 carbon atoms. The hemoglobin can be formed into a cross-linked material whose average molecular weight is 68,000 to 600,000, mostly 250,000 or less.

It has been discovered that when carrying out the process of the invention if particular paramaters are chosen and a particular type of cross-linking agent is utilized that the formation of an intramolecular cross-linked hemoglobin material is favored. This intra-molecular cross-linked hemoglobin material is one in which a polypeptide unit of the hemoglobin tetramer is joined to another polypeptide unit of the same hemoglobin tetramer. Thus, the present invention further contemplates an intra-molecular cross-linked hemoglobin composition having the following structure:

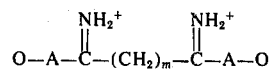   II wherein O represents a polypeptide unit of hemoglobin, especially a single polypeptide unit, A represents the residue of an epsilon amino group of a lysyl residue and $m$ equals 6 to 12. The present invention broadly contemplates, in respect of such intra-molecular cross-linked hemoglobin material, compositions wherein at least one polypeptide unit of a hemoglobin tetramer is cross-linked to another polypeptide unit of the same hemoglobin tetramer by a cross-linking agent of the formula:

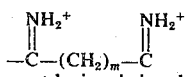

said cross-linking agent being joined to the polypeptide units at epsilon amino groups of lysyl residues. The intra-molecular cross-linked hemoglobin material of the present invention has a decidedly lower molecular weight than the inter-molecular cross-linked hemoglobin material. The molecular weight of a hemoglobin intra-molecular cross-linked material is broadly between 68,000 and 6000,000. However, surprisingly in most instances at least 80% of the material recovered from an inter-cross-linking has a molecular weight between 68,000 and 85,000. Thus, instead of hemoglobin dimer or tetramer units being joined by the cross-linking agent to hemoglobin dimer or tetramer units of another hemoglobin structure, the polypeptide units of the same hemoglobin structure are joined together. This means that the material has the molecular weight substantially of naturally occurring hemoglobin. It has substantially all of the physical properties of natural hemoglobin with the notable exception that the individual polypeptide units are joined covalently by a cross-linking agent. When injected or otherwise inserted into a mammalian blood stream, the cross-linking agent keeps the polypeptide units intact so that the hemoglobin can function as a protein blood substitute or expander and yet does not produce any of the perhaps somewhat unnatural reactions which might occur by the use of material having extremely high molecular weights.

The cross-linked hemoglobin material can readily be injected, together with the proper inorganic salts, into the blood stream whereby it will maintain the desired blood pressure within the blood vessels. By cross-linking the hemoglobin through use of the cross-linking agent whose formula is set forth above, an advantage was obtained. The hemoglobin was not readily subjected adversely by binding a naturally occurring substance in the plasma known as haptoglobin.

It has been observed that natural hemoglobin, as opposed to cross-linked hemoglobin, is adversely affected by the presence of haptoglobin in that they form a complex which is rapidly removed by the reticulo-endothelial cells of the liver and spleen. Additionally, the cross-linked intra and inter-hemoglobin is entirely compatible with the preestablished chemical conditions within the body such that it is not readily attacked by such chemicals and when it ultimately breaks down, it forms amino acids which the body can readily use or dispose of without complications. Moreover, cross-linked hemoglobin is not readily removed from the body through the kidneys as is the case with natural hemoglobin. The reason for this is that the natural hemoglobin dissociates to form molecules of average molecular weight of 34,000 and some of 17,000 which are relatively small protein molecules readily excreted by the kidneys compared to the cross-linked hemoglobin, which is not.

Broadly, inter-cross-linked hemoglobin of the present invention having an average molecular weight of between 68,000 and 600,000 is prepared by the following general steps:

a. Initially, hemoglobin is obtained from the red blood cells in a known manner by lysing the red cells and removing all membrane materials by high speed centrifugation.

b. The resulting hemoglobin dimer or tetramer is then reacted at a temperature between −5°C and +10°C with a cross-linking agent of the formula:

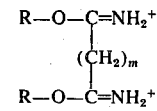

wherein $m$, R has the above meaning at a pH between 7.4 and 8.5, prefereably by the continuous addition of triethylamine. There is obtained a product comprising some unreacted hemoglobin, hemoglobin of molecular weight higher than 600,000, and hemoglobin whose molecular weight is between 68,000 and 600,000.

c. Thereafter, the so recovered product is subjected to precipitation by the addition of ammonium sulfate to 0.2 to 0.25 saturation which precipitates the very high molecular weight material, i.e., material of molecular weight in excess of 600,000; after centrifugation of the precipitate, the partially purified reaction product is subjected to a further addition of ammonium sulfate by increasing the ammonium sulfate concentration to a value of 50 percent of saturation whereby there is obtained a cross-linked hemoglobin material of molecular weight between 68,000 and 600,000.

d. The so precipitated ammonium sulfate-cross-linked hemoglobin composition is subjected to dialysis to remove ammonium sulfate material from the cross-linked hemoglobin, thereby recovering the desired cross-linked hemoglobin material of molecular weight between 68,000 and 600,000 in the proper salt solution.

The process, therefore, involves several steps. These can be broken down into four separate areas, to wit, the preparation of the hemoglobin reactant, the preparation of cross-linked hemoglobin, the removal of the desired cross-linked hemoglobin from other hemoglobin-containing materials, and the separation of the desired cross-linked hemoglobin from other materials, especially salts of ammonium sulfate and their replacement by salts in a solution isotonic with red cells.

It is noted that the hemoglobin is prepared from red cells by lysing the red cells in known manner and removing all membrane materials by high-speed centrifugation. The hemoglobin is then reacted with the cross-linking agent for a period of time up to two hours at a temperature between 0°C and +10°C, preferably at a pH between 7.5 and 8.5. Specifically, the hemoglobin is generally present in the solution in which the reaction takes place in an amount between 7 and 12 grams per 100 cc. of solution. The hemoglobin can dissociate in solution to some extent forming polypeptide subunits yielding some dimers of molecular weight of 34,000 which in turn can be cross-linked to form polyhemoglobin of 68,000 molecular weight or more. Tetramers form heavier polyhemoglobin.

It has been discovered that if the cross-linking agent is a relatively long cross-linking agent such as were the value $m$ is 6–12 and especially 6–8 and the hemoglobin reactant is present at 1% an intra-molecular cross-linked hemoglobin material is obtained wherein polypeptide units are joined together by the cross-linking agent. The junction of the cross-linking agent with the polypeptide units is at epsilon amino groups of lysyl residues on each of the polypeptide units. It is theorized that by using a long chain, bifunctional cross-linking agent the chain length extends from one subunit of the hemoglobin dimer or tetramer to another subunit. The result is that there is obtained a product of average molecular weight slightly greater than 68,000 wherein the subunits are joined by the cross-linking agent. By choosing a long cross-linking agent, the opportunities for joining the functional group of the cross-linking agents to epsilon amino groups of polypeptide units of the same hemoglobin structure is markedly increased. It is believed that the phenomenon does not occur to any major extent when $m$ equals 1 – 5 because the length of the cross-linking agent is not sufficient to allow the — OR groups to contact with the hydrogen atom on the epsilon amino group to effect the linkage. The bonds between the atoms of the cross-linking agent are not sufficiently elastic so as to allow the cross-linking agent to span the distance between polypeptide units of the same hemoglobin structure. Thus, when dealing with a cross-linking agent of a short chain length, the cross-linking agent will join hemoglobin dimer or tetramer units of one hemoglobin structure with subunits of a neighboring hemoglobin dimer or tetramer structure, whereby there is formed the inter-molecular cross-linked hemoglobin material.

It has been found that the concentration of the hemoglobin in the solution in which the cross-linking agent is placed plays an important role in directing the process and in determining the resultant product. While the hemoglobin cross-linking process broadly of the invention can be carried out using a hemoglobin solution containing from as little as 0.5 wt. percent hemoglobin to as much as 12% by weight hemoglobin, the results depend upon the hemoglobin concentration. Where hemoglobin is present in an amount between 0.5 to 1.5 wt. percent in the solution, the cross-linked hemoglobin material is largely and intramolecular cross-linked hemoglobin material. Generally speaking at least 80% of the cross-linked hemoglobin synthesized using such dilute hemoglobin solution has a molecular weight between 68,000 and 85,000, i.e., virtually all of the cross-linking occurs within polypeptide subunits of the same hemoglobin structure.

On the other hand, if the hemoglobin concentration is between about 1.5 and 8% by weight, a mixture of intra-molecular cross-linked hemoglobin and inter-molecular cross-linked hemoglobin is obtained. Similarly, if a more concentrated hemoglobin solution is utilized in the process, say one having a hemoglobin concentration of 8–12 percent by weight, the product is virtually entirely an inter-molecular cross-linked hemoglobin structure, i.e., one containing polypeptide units from different hemoglobin structures.

The manner by which the intra-molecular cross-linked hemoglobin material is prepared is generally along the same lines as the method outlined above in respect of the preparation of inter-molecular cross-linked hemoglobin. Generally speaking, the material is prepared by contacting a 0.5 to 1.5 wt. percent hemoglobin solution with the cross-linking agent defined above wherein $m$ is 6–12, preferably 6–8R having the above described meaning at a pH of 7.4 to 8.5. The addition of the reactants is made over a period of time such as from 1 to 1.5 hours so that the long chain cross-linking agent has a greater tendency to effect intra-molecular cross-linkages than to effect inter-molecular cross-linkages. The product is adjusted to pH 7.4 and thereafter filtered and the precipitate or any solid matter is discarded. The supernatent liquid is concentrated by ultrafiltration to a hemoglobin concentration between 5 and 7%, especially 6% and it is dialyzed extensively against a 0.9 percent by weight sodium chloride solution (isotonic saline).

The so dialyzed material is passed through a millipore filter having a 0.2 micron filter size.

Cross-linking agents which can be utilized in the present invention are those having the above formula including, in particular, dimethylmalonimidate, diethylsuccinimidate, dimethylglutarimidate, dimethyl or diethyl-adipimidate, dimethylpimelimidate, dimethylsuberimidate, dimethylazelamidate, dimethylsebacimidate, dimethyldecanoimidate, and dimethyldodecanonimidate, all as the hydrochlorides.

Of the above listed cross-linking agents, it is particularly preferred to employ the dimethylsebac imidate where $m$ equals 8 The reason for this is that the sebacimidate unit is of the most desired length and corresponds most closely to the length between lysene groups of adjoining polypeptide units.

The intra-molecular cross-linking reaction removes a positively charged epsilon $NH_3^+$ group and replaces it with an imidate group $NH_2^+$ thereby not altering the surface charge properties of the hemoglobin molecule. This is a decided advantage as it is desired to maintain many of the properties of the hemoglobin material as closely as possible to the natural material and thereby not to change any surface charge properties of the protein thereof.

The amount of cross-linking agent will determine to some extent, the extent of the cross-linking operation, it being remembered that materials of average molecular weight in excess of 6000,000 are undesirable as they are too large to be accommodated within the blood circulatory system. The cross-linking agent is preferably present in an amount of 4.4 g per 100 cc. of a 10% hemoglobin solution, although generally between 3 and 5 g. per 100 cc. of 10% hemoglobin solution. In the subject process mixtures of intra and intermolecular cross-linked materials can be provided if wherein m equals 1 to 12. However, intra-molecular cross-linked materials are generally not found wherein $m$ in the formula is less than 6. Conversely, inter-molecular cross-linked materials are not generally found when $m$ is greater than 6 when the hemoglobin concentration is low.

The process is conducted by maintaining the pH between 7.5 and 8.5 suitably by continuously introducing into the reaction mixture small amounts of triethylamine. The triethylamine has been found to be an exceptionally useful base employed to maintain the pH within the described range. When the reaction is complete, no more triethylamine need be added. Completion of the reaction is readily determined through use of a pH meter. Normally, the reaction would continuously tend to take up basic materials, thereby decreasing the pH. The pH decrease is compensated by the triethylamine. When all of the reactants have reacted, no pH decrease occurs, indicating completion of the reaction and the cessation of the necessity of adding the triethylamine.

The reaction product is suitably subjected to an initial precipitation to remove extremely high molecular weight cross-linked hemoglobin materials. This is done by adding an ammonium sulfate saturated solution such that the ammonium sulfate is present in an amount of at least 20% to 25% of saturation, the upper limit being determined in response to the desired upper average molecular weight limit to be recovered as the desired product.

After there is recovered the precipitate of ammonium sulfate-cross-linked hemoglobin by raising the ammonium sulfate concentration to 50% of saturation the ammonium and sulfate ions can readily be removed from the cross-linked hemoglobin by dialysis. Dialysis can be performed to remove the ammonium and sulfate ions present and to replace them with inorganic salts which are desired for incorporation into the blood stream when the cross-linked hemoglobin is added thereto.

When the cross-linked hemoglobin is in admixture with inorganic salts, there is thus constituted a cross-linked hemoglobin protein substitute composition comprising the following components: 5 to 6% polyhemoglobin in 310 milliosmolar* solution of sodium phosphate in water, the solution having a pH of 7.4. However, between 4 and 8 weight percent of polyhemoglobin can be used in an aqueous salt solution of pH 7.4 isotonic to blood.

\* "Milliosmolar" designates the number of millimols required to produce a specific osmotic pressure. 310 milliosmolar refers to the concentration of inorganic salts which would correspond to that salt concentration in normal blood plasma.

DESCRIPTION OF PREFERRED EMBODIMENTS

As is evident above, the hemoglobin molecule is a complicated molecule consisting actually of four polypeptide units, each of which is loosely bonded to the other units. In the hemoglobin tetrameric molecule, which has a molecular weight of about 68,000, there are two alpha polypeptide units and two beta polypeptide units. The inter-molecular cross-linking occurs between these units of different hemoglobin tetrameric molecules as shown below:

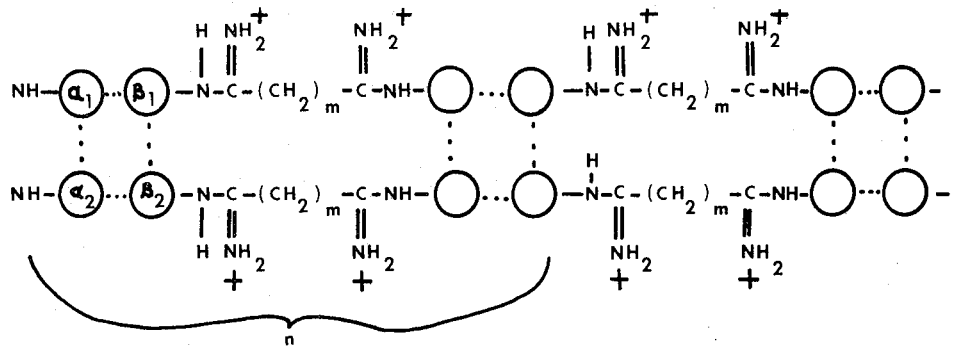

In the above formulae the epsilon amino group of each subunit which reacts is shown. When intra-molecular cross-linking occurs between different hemoglobin molecules rather than within the same hemoglobin molecule, the reaction is as shown below:

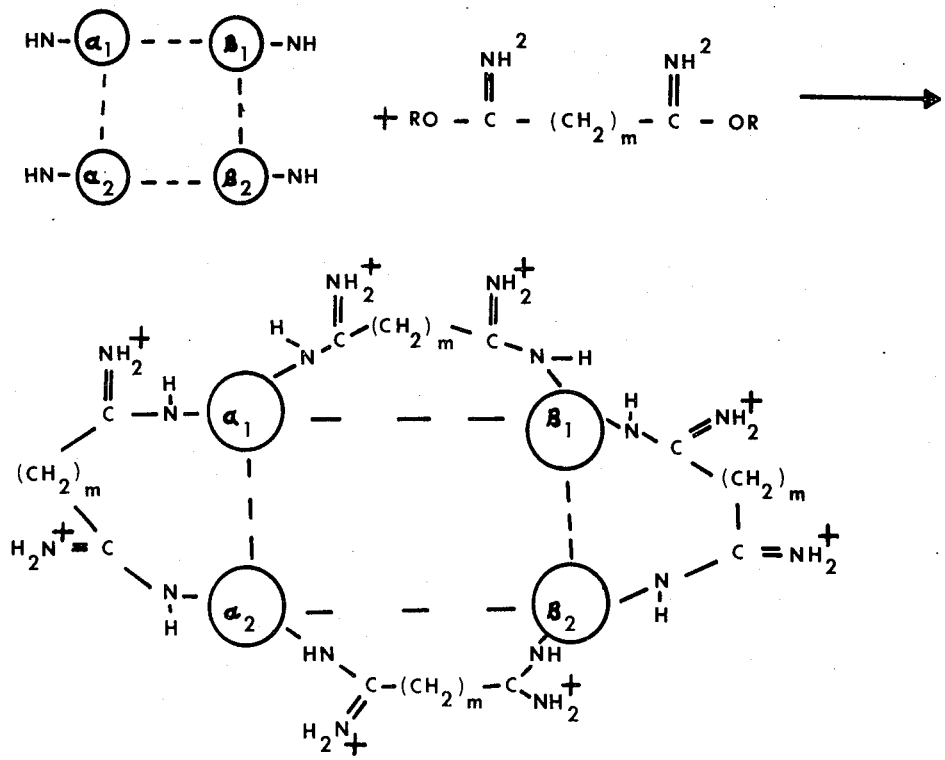

The epsilon amino groups from each polypeptide unit which partakes in the reaction is shown above. The reaction can also occur between $\alpha_1$ and $\beta_2$ and $\beta_1$ and $\alpha_2$ groups if the cross-linking agent is long enough.

This makes efficient use of the cross-linking agent. Additionally, the so-formed cross-linked hemoglobin has a beneficial linkage such that the cross-linked hemoglobin is not susceptible to attack by haptoglobin present in the blood stream or to dissociation into low molocular weight units.

From the above formulae depicting the polymeric units of the cross-linked hemoglobin, it is seen that there are different repeating units depending upon the type of cross-linking conditions employed. In the formula for inter-cross-linked hemoglobin n is between 2 and 5. Thus, this cross-linked hemoglobin can be thought of as an oligomer, i.e., a cross-linked polymeric hemoglobin where there are only a limited number of repeating units. Obviously, material of higher molecular weight cannot beneficially be employed in the blood stream. Such material may also be too resistant to breakdown, and thus may be retained for an unnecessarily long period of time after a patient has recovered. The intra-molecular cross-linked material is not readily classified. It is oligomeric to the extent that cross-linking occurs between polypeptide units of different hemoglobin dimer or tetramer units.

The plasma protein substitutes of the present invention are particularly useful in crises situations where it is desired to rapidly re-establish the desired blood pressure level in the body. The material functions, at least in part, in the same manner as serum albumin. However, the cross-linked hemoglobins of the present invention additionally beneficially employ the hemoglobin of the red blood cells, which hemoglobin would otherwise become discarded. They are completely compatible with the human blood circulatory system which makes them highly desirable in that they do not encounter problems with respect to natural body elimination thereof encountered by purely synthetic plasma blood substitutes or plasma expanders. Moreover, the novel plasma expands do not form antibodies — a disadvantage which characterizes other material heretofore prepared.

The bifunctional imidates used to prepared cross-linked hemoglobin are compounds of the formula:

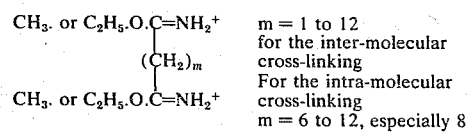

These reagents react with epsilon-amino groups of lysyl residues on the surface of each of the four subunits of the hemoglobin tetramer.

In concentrated solutions of hemoglobin (7–12%) and at a pH of 8.5, for example, cross-linking occurs between subunits of different tetramers giving rise to hemoglobin polymers whose dissociation is prevented by the covalent cross-linkages. The reaction may be illustrated as follows:

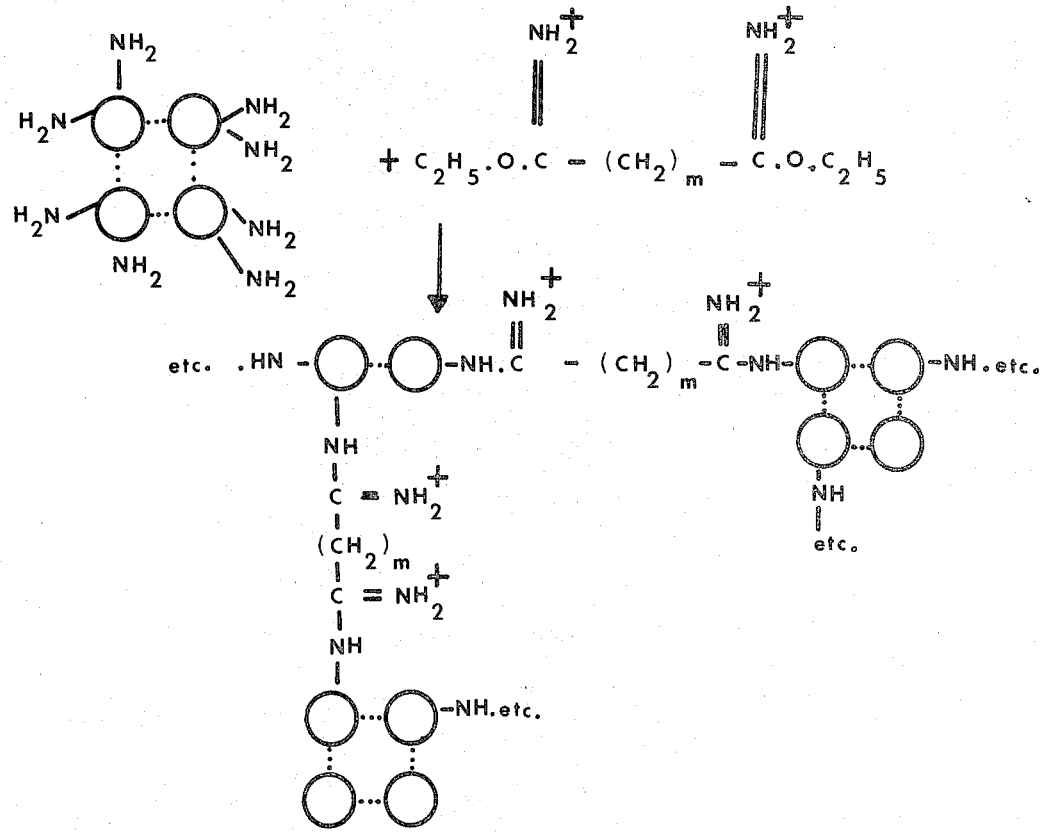

Instead of the tetramer reacting as shown, a dimer such as an alpha-beta dimer can react where O = one subunit of a hemoglobin tetramer and the —NH₂ groups represent the epsilon-amino groups of the lysyl residues. In the intra molecular cross-linking the cross-linking agent is of the proper size to inhibit dissociation of the hemoglobin tetramer.

In order to more fully illustrate the nature of the invention and the manner of practicing the same, the following examples are presented.

EXAMPLE 1

A charge of 2.4 g of diethyl-malonimidate hydrochloride was dissolved in 5 ml. of 0.05M sodium phosphate buffer, pH 8.5 in a breaker cooled to 5°C containing a magntic stirrer. A solution of 5N NaOH was added dropwise until the reagent solution became milky (pH 7-8) and 50 ml. of a 10% solution of hemoglobin was quickly added. The pH of the solution was adjusted to 8.5 with alkali and maintained at this pH as the reaction proceeded. After 1½ to 2 hours, the reaction was essentially completed as noted by cessation of liberation of acid.

The poly-hemoglobin was separated from low molecular weight material by precipitation at 0.5 saturation with ammonium sulfate and recovered by centrifugation. The precipitate was redissolved in water and reprecipitated with ammonium sulfate twice again. The final precipitate was dissolved in water to make a 10% solution and dialyzed extensively against a solution with 310 milliosmolar with respect to sodium phosphate, pH 7.4, filtered through a 0.25 $\mu$ filter and stored at 5°C. The yields in three experiments were 40, 44 and 47% of the starting material, depending on the concentration of the hemoglobin solution.

EXAMPLE 2

The reaction and isolation were carried out as in Example 1 above, except that the 0.05M sodium phosphate buffer, pH 8.5 and 5N NaOH were replaced by triethylamine in order to decrease the extent of denaturation of hemoglobin when excess strong alkali was added. Yields in excess of 55–60 percent were obtained.

EXAMPLE 3

The poly-hemoglobin prepared by the above two procedures contained a small fraction (5%) with a molecular weight of 800,000 which contributed to formation of insoluble material on standing. This was removed by preliminary precipitation at 0.20–0.25 saturation with ammonium sulfate. This precipitate was discarded and the remaining poly-hemoglobin precipitated by raising the ammonium sulfate concentration to 0.50. A solution of this preparation is stable in the frozen state.

In the above examples diethyl malonimidate hydrochloride was employed as the cross-linking agent. However, it has been found that other cross-linking agents of the formula set forth above can be employed. These include dimethyl adipimidate and dimethyl suberimidate. The latter provides intra-molecular cross-linked products as shown below in Examples 4 – 7.

The poly-hemoglobin prepared by the present invention is superior to the natural hemoglobin as a plasma protein substitute since hemoglobin itself has a limited life span when infused into the plasma. Hemoglobin itself tends to dissociate into the dimers which (a) combine with the normal plasma haptoglobin to form a complex removed by the reticuloendothelial cells of the liver and spleen and which (b) have a molecular weight (34,000) which allows it to be excreted by the kidneys. The hemoglobin polymers do not combine with plasma haptoglobin and do not dissociate entirely to small units which can be excreted by the kidneys.

To demonstrate, the life span in the plasma of normal hemoglobin and poly-(inter-molecular cross-linked) hemoglobin was determined in rabbits. Initially, the life span of rabbit hemoglobin, both normal hemoglobin and poly-hemoglobin, was determined in these test rabbits. Thereafter, the duration in the plasma of human hemoglobin, both normal and poly-hemoglobin, was determined in these test animals. The hemoglobin polymer employed was a mixture of about 85%, molecular weights being in the range of 300,000 to 450,000. An average of 27 out of a total of 46 lysyl amino groups per tetramer were involved in the cross-linking reaction. The following table lists the results of the life span study. In the table T — ½ = the time of removal from the plasma of one-half of the injected material for the normal and poly-hemoglobin administered to the rabbits.

|   |   | Normal Hemoglobin | | Poly-Hemoglobin | |
|---|---|---|---|---|---|
|   |   | Dose (g/Kg) | T-½(min) | Dose(g/Kg) | T-½(min) |
| 1. | Rabbit hemoglobin into rabbits | 0.134 | 55 | 0.134 | 245 |
|   |   | 0.137 | 80 | 0.137 | 300 |
|   |   | 0.50 | 85 | 0.50 | 900 |
| 2. | Human hemoglobin into rabbits | 0.27 | 80 | 0.27 | 900 |
|   |   | 0.42 | 110 | 0.42 | 1605 |

INTRA-MOLECULAR CROSS-LINKED HEMOGLOBIN

EXAMPLE 4

A charge of 0.44 g. of diethylmalonimidate hydrochloride was added to 100 ml. of a 1% solution of human hemoglobin at 5°C with stirring in 5 divided equal portions, maintaining the pH at 8.5 by the addition of triethylamine. After 1 to 2 hours the solution ceased to require triethylamine for pH maintenance. The pH of the solution was brought to 7.4 with dilute HCl solution and centrifuged to remove any insoluble excess reagent. The modified hemoglobin solution was concentrated by ultrafiltration until the concentration of hemoglobin reached 5-6% and dialyzed extensively against several changes of 0.9% Nacl solution.

EXAMPLE 5

The reaction and procedure was carried out as in Example 4 above using 0.52 g of dimethyl adipimidate hydrochloride for each 100 ml. of 1% hemoglobin solution.

EXAMPLE 6

The reaction and procedure of Example 4 was repeated as above using 0.57 g. of dimethyl-suberimidate hydrochloride for each 100 ml. of 1% hemoglobin solution.

EXAMPLE 7

The reaction and procedure of Example 4 was repeated as above using 0.63 g. of dimethyl-sebacimidate hydrochloride for each 100 ml. of 1% hemoglobin solution.

In order to determine the extent of intramolecular cross-linkage the approximate molecular weights of the modified hemoglobin prepared by the above examples were determined by filtration through a chromatographic column of Sepharose 6B (Pharmacia Co.) standardized with a number of proteins of known molecular weights, including unmodified human hemoglobin, whose molecular weight is 68,000. When contacted with a 1% hemoglobin solution and added in divided portions, these reagents yielded a product of which some 85–90% had an approximate molecular weight of 68,000 although some 30 of the total 44 lysine residues had reacted with the reagent.

Since the aim of these experiments was to produce an intra-molecular cross-linked hemoglobin tetramer which would not dissociate into subunits of lower molecular weight, the extent of potential dissociation was measured by subjecting each modified hemoglobin to the dissociating action of sodium dodecyl sulfate during polyacrylamide gel electrophoresis. After staining each protein band and destaining, the relative distribution of the dissociable units was measured by use of a scanning densitometer and comparison with proteins of known subunit molecular weights.

The results are illustrated in the following table which demonstrates the effectiveness of the larger chain diimidate esters in the intra-molecular cross-linking reaction.

Distribution of Dissociable Sub-Units of Cross-linked Hemoglobins by Sodium Dodecyl Sulfate

| Dissociable Sub-Unit | Control Hb | DEM-* Hb | DMA-* Hb | DMS-* Hb | DMSb-* Hb. |
|---|---|---|---|---|---|
| | (0/0) | (0/0) | (0/0) | (0/0) | (0/0) |
| Monomer | 100.0 | 37.4 | 31.9 | 6.8 | 2.6 |
| Dimer | 0 | 31.2 | 35.5 | 19.1 | 10.2 |
| Trimer | 0 | 0.5 | 11.5 | 25.3 | 18.8 |
| Tetramer | 0 | 0.0 | 6.6 | 21.4 | 33.6 |
| >Tetramer | 0 | 30.0 | 14.2 | 27.2 | 34.6 |

*DEM = diethyl malonimidate
DMA = dimethyl adipimidate
DMS = dimethyl suberimidate
DMSb = dimethyl sebacimidate
Hb = hemoglobin

What is claimed is:

1. A plasma protein substitute comprising a hemoglobin containing material in polymeric form, said polymer having the following repeating unit:

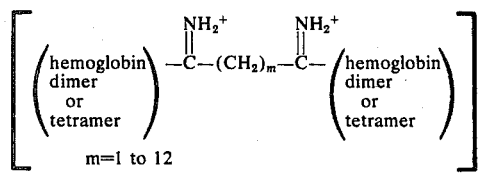

said polymer having an average molecular weight of between 68,000 and 600,000, the

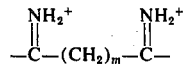

moiety being joined to the hemoglobin dimer or tetramer group through epsilon amino groups of lysyl residues of the hemoglobin dimer or tetramer.

2. A composition according to claim 1 wherein said polymer has between 1 and 10 repeating units.

3. A composition according to claim 1 wherein m is between 1 and 4.

4. A method of preparing a cross-linked hemoglobin material which comprises contacting hemoglobin with a cross-linking agent having the formula:

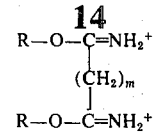

wherein R is an alkyl group of one to eight foot carbon atoms and $m$ is 1 to 12 at a temperature between 0° and +10°C at a pH between 7.5 and 8.5 and recovering a polymeric crosslinked hemoglobin composition having an average molecular weight between 68,000 and 600,000.

5. A method according to claim 4 wherein the reaction is carried out for a period up to about 2 hours while continuously adding triethylamine to maintain the pH between 7.5 and 8.5, the reaction being carried out at a temperature between 0° and 5°C.

6. A method according to claim 5 wherein the hemoglobin is present in an amount between 7 and 12 grams per 100 cc of solution being treated, and there is present about 4.4 grams of cross-linking agent for 100 cc. of 10% hemoglobin solution.

7. A process according to claim 6 wherein $m$ is between 1 and 4.

8. A process according to claim 7 wherein the cross-linking agent is in the form of a hydrochloride.

9. A process according to claim 8 wherein the cross-linking agent is diethyl malonimidate hydrochloride.

10. A process according to claim 4 wherein $m$ is 6 to 12.

11. A process according to claim 10 wherein the hemoglobin is present as a 0.5 to 8% weight percent solution.

12. A process according to claim 11 wherein the hemoglobin is present as a 0.5 to 1.5 weight percent solution.

13. A process according to claim 10 wherein the cross-linking agent is dimethyl suberimidate.

14. A process according to claim 10 wherein the cross-linking agent is dimethyl azelaimidate.

15. A process according to claim 10 wherein the cross-linking agent is dimethyl sebacimidate.

16. A process according to claim 10 wherein the cross-linking agent is dimethyl decanoimidate.

17. A process according to claim 10 wherein the cross-linking agent is dimethyl dodecanoimidate.

18. A process according to claim 4 wherein the cross-linking agent is dimethyl adipimidate.

19. An intramolecular cross-linked hemoglobin composition wherein at least one polypeptide unit thereof is cross-linked to another polypeptide single unit of the same hemoglobin tetramer by a cross-linking agent having the formula

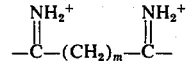

wherein $m$ = 6 to 12, said cross-linking agent being joined to the polypeptide units at epsilon amino groups of lysyl residues, said composition having a molecular weight, determined by gel electrophoresis of between 68,000 and 85,000.

20. A cross-linking agent according to claim 19 wherein at least 80% of the components have a molecular weight between 68,000 and 85,000.

21. An intra-molecular cross-linked hemoglobin composition according to claim 20 wherein $m$ = 6.

22. An intramolecular cross-linked hemoglobin composition according to claim 20 wherein $m$ = 7.

23. An intramolecular cross-linked hemoglobin composition according to claim 20 wherein $m$ = 8.

* * * * *

UNITED STATES PATENT OFFICE
CERTIFICATE OF CORRECTION

PATENT NO. : 3,925,344
DATED : December 9, 1975
INVENTOR(S) : Abraham Mazur

It is certified that error appears in the above-identified patent and that said Letters Patent are hereby corrected as shown below:

Column 6, line 43

"60000,000" should be "600,000"

Column 9, line 11

"molocular" should be "molecular"

Signed and Sealed this thirtieth Day of March 1976

[SEAL]

Attest:

RUTH C. MASON
Attesting Officer

C. MARSHALL DANN
Commissioner of Patents and Trademarks